(No Model.)
W. A. ELLIS.
WAGON TIRE SHRINKER AND STRETCHER.
No. 599,324. Patented Feb. 22, 1898.
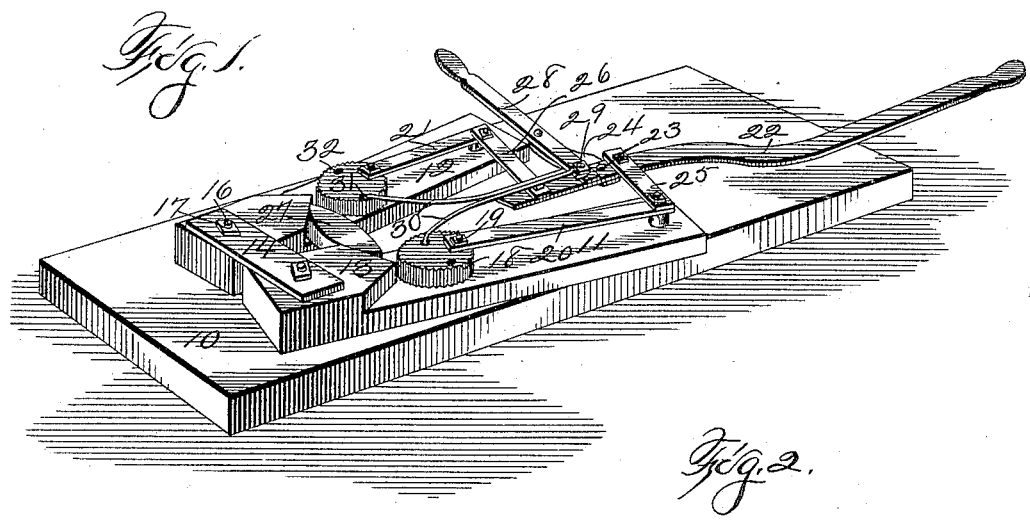
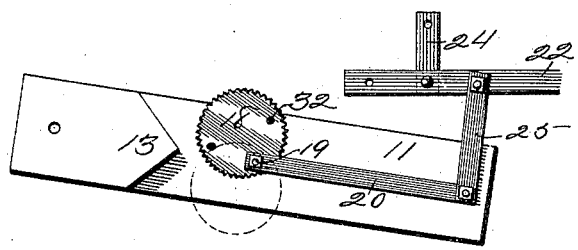
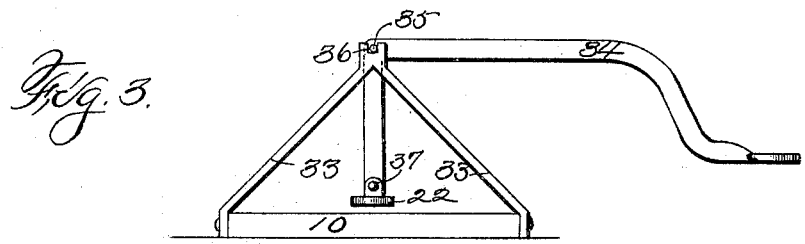
Witnesses:
R. G. Orwig.
W. J. Sankey.
Inventor: Walter A. Ellis,
By Thomas G. and J. Ralph Orwig,
attorneys.

UNITED STATES PATENT OFFICE.

WALTER A. ELLIS, OF ALTOONA, IOWA.

WAGON-TIRE SHRINKER AND STRETCHER.

SPECIFICATION forming part of Letters Patent No. 599,324, dated February 22, 1898.

Application filed June 28, 1897. Serial No. 642,592. (No model.)

*To all whom it may concern:*

Be it known that I, WALTER A. ELLIS, a citizen of the United States, residing at Altoona, in the county of Polk and State of Iowa, have invented a new and useful Wagon-Tire Shrinker and Stretcher, of which the following is a specification.

The object of this invention is to provide a device of simple, cheap, strong, and durable construction that may be operated by hand to either shrink or stretch wagon-tires and the like.

My object is, further, to provide improved means for clutching the tire, which same may be readily and quickly operated when the tire is in position in the device, so that the operation of shrinking the tire may be carried on several times before the tire cools; and my object is, further, to provide means whereby the device may be readily and quickly adapted for use as a tire-shrinker or a tire-stretcher, and when used for either purpose the clutching devices may be made to firmly engage the tire.

My invention consists in certain details in the construction, arrangement, and combination of the various parts of the device, whereby the objects contemplated are attained, as hereinafter more fully set forth, pointed out in my claim, and illustrated in the accompanying drawings, in which—

Figure 1 shows a perspective view of the device in position ready for use. Fig. 2 shows a detail plan view of a portion of the stretching and shrinking device. Fig. 3 shows a front elevation of a modified form of device by means of which the stretching and shrinking mechanism may be operated by footpower.

Referring to the accompanying drawings, the reference-numeral 10 indicates a wooden base, which rests upon the ground or any suitable support. Upon this base I have placed the metal plates 11 and 12, the plate 11 being longer than the plate 12. When these plates are in their normal positions, they stand at a slight angle relative to each other, but when in their closed position they are substantially parallel. At the front ends of the plates 11 and 12 are the upwardly-extending wedge-shaped projections 13, and a metal plate 14 is placed on top of the projections. Bolts 16, having nuts 17 thereon, pivotally connect the plate 14, projections 13, and the base 10 together. Eccentrics 18, having notched peripheries, are mounted on bolts 19, which pass through the plates 11 and 12 in close proximity to the projections 13. The bolts 19 are also passed through the metal bars 20 and 21, which are placed above the eccentrics 18, and extend in the same direction as the plates 11 and 12. The bar 20 is constructed longer than the bar 21. Openings 32 are made in the eccentrics 18, the purpose of which will be hereinafter set forth. The eccentrics 18 are so positioned relative to the projections 13 that when a tire is placed between the eccentrics and projections they form a clutch, as hereinafter made clear.

The reference-numeral 22 indicates a lever pivoted by means of a bolt 23 and brace 24. This lever extends from a position between the rear portions of the plates 11 and 12 outwardly past the end of the base 10.

25 indicates a link pivoted to the lever 22 in rear of the bolt 23, and the other end of the link 25 and the plate 11 and bar 20 are pivotally connected. 26 indicates a similar link pivoted in front of the bolt 23 and having its other end pivotally connected with the plate 12 and bar 21. Thus it is obvious that when the lever 22 is moved in one direction the plates 11 and 12 and connected parts will move toward each other, and when the lever is moved in the opposite direction the plates will recede from each other.

The eccentrics 18 are placed in such proximity to the projections 13 that when moved they may freely pass the said projections, but when a tire is placed between the projections and the eccentrics the notched peripheries of the latter will engage the tire, and the tire will be clutched between the said eccentrics and the projections.

When it is desired to shrink a tire, the eccentrics 18 are rotated until their greater portions are on the inner sides of the projections 13, and then the tire is placed between the eccentrics and projections. The lever 22 is next operated so that the plates 11 and 12 will approach each other. This, obviously, will cause the eccentrics 18 and projections 13 to tightly clutch the tire, and thus upon a further operation of the lever 22 a force will be applied directly upon the tire to shrink it. I have placed a crescent-shaped block 27 between the projections 14 to prevent the tire from bending when the tire is being shrunk.

To stretch the tire, the eccentrics are rotated until their greater portions are on the outer sides of the projections 13. Then the tire is placed in position between the eccentrics and projections and the lever 22 is operated so that the plates 11 and 12 recede from each other. This will cause the eccentrics and projections to clutch the tire, and a force will be exerted outwardly to stretch the tire.

In use I have found that owing to the smooth outer surface of the tire the notched peripheries of the eccentrics would not always securely hold the tire. To firmly hold the eccentrics to the tire, I have provided the following mechanism: The reference-numeral 28 indicates a lever pivoted at 29 to the brace 24 and base 10 and having two arms 30 pivotally connected with its one end. The said arms 30 extend forwardly and their free ends 31 are bent downwardly at right angles. The ends 31 of the arms 30 are designed to enter the openings 32 in the eccentrics 18.

The operation of the parts just described is as follows: Assuming that it is desired to shrink a tire and that the eccentrics 18 and the tire have been placed in their proper positions, as hereinbefore described, each of the ends 31 of the arms 30 is placed in one of the openings 32 in the inner portions of the eccentrics 18. Then the free end of the lever 28 is operated to move rearwardly, which, obviously, will cause the arms 30 to move forwardly, and this forward movement of the arms 30 will in turn push the eccentrics forwardly and outwardly against the tire. The operation of the lever 28 may be continued until the tire is firmly held between the eccentrics 18 and projections 13, so that when the lever 22 is operated the eccentrics will not slip relative to the tire. After the lever 22 has been operated to shrink the tire it may be returned to its normal position and the lever 28 operated to move the eccentrics 18 forwardly and outwardly, so that they will firmly engage the tire, and then the lever 22 may be again operated to shrink the tire. Thus it is obvious that the operation of shrinking the tire may be carrried on several times before the tire cools.

When it is desired to stretch a tire, the eccentrics 18 and the tire are placed in their proper positions, as hereinbefore described, and then the ends 31 of the arms 30 are placed in two of the openings 32, located in the outer portions of the eccentrics 18. The free end of the lever 28 is then operated to move rearwardly, and the arms 30 will force the eccentrics 18 downwardly and inwardly against the tire. Then when the lever 22 is operated to cause the plates 11 and 12 to recede from each other the tire will be firmly clutched between the eccentrics 18 and the projections 13. Thus it is obvious that when it is desired to shrink a tire this device may be used to firmly hold the eccentrics 18 to the tire and by slightly changing the positions of the arms 30 the device will perform the same function when a tire is being stretched.

It may be readily seen that the lever 22 may be operated by hand to thereby shrink or stretch the tire, but I have also provided mechanism whereby the lever may be operated by foot-power. This mechanism is illustrated in the modified form in Fig. 3 and is composed of the following parts: The reference-numeral 33 indicates two supports hinged at their lower ends to the sides of the base 10. 34 indicates a bell-crank lever having journals 35 thereon, the said journals being mounted in bearing-boxes 36 in the upper ends of the supports 33. The lower end of the bell-crank lever 34 is detachably connected with a lug 37 on the lever 22. In use with this device it is obvious that when the free end of the lever 34 is pushed downwardly the lower end of the said lever will force the lever 22 laterally in one direction, and this movement of the lever 22 will, as previously made clear, cause the plates 11 and 12 to advance toward or recede from each other. When it is desired to move the lever 22 in the opposite direction, the bell-crank lever 34 is detached from the lug 37, and the journals 35 are removed from their bearings 36. The bell-crank lever is then turned about and placed in position from the opposite side of the device by placing the journals 35 in their bearings 36 and attaching the lever 35 to the lug 37. Thus it is obvious that when the lever 34 is again operated the lever 22 will be moved in the opposite direction.

Having thus described the construction, arrangement, and function of the various parts of the device, what I claim as new therein, and desire to secure by Letters Patent of the United States therefor, is—

An improved tire shrinker and stretcher, comprising in combination, a base, two plates pivotally mounted thereon in planes approximately parallel with each other, and having formed on the upper surfaces of the said pivoted ends substantially triangular projections, a rough-surface eccentric pivoted to each of said plates adjacent to the said triangular projections and each eccentric having openings on its top face on opposite sides thereof, a lever fulcrumed to the base, links pivoted to the ends of the said plates and also to the said lever on opposite sides of its fulcrum, a second lever fulcrumed to the base, and rods pivoted to the ends of said second lever beyond its fulcrum and having downwardly-inclined ends designed to be placed in either of the holes in the top surfaces of the eccentrics, all arranged and combined substantially in the manner set forth and for the purposes stated.

WALTER A. ELLIS.

Witnesses:
W. J. COMBS,
T. E. HAINES.